US009189210B2

(12) United States Patent
Zala et al.

(10) Patent No.: US 9,189,210 B2
(45) Date of Patent: Nov. 17, 2015

(54) USING SOURCE CODE GENERATED FROM A DATA MODEL FILE TO GENERATE A GRAPHICAL USER INTERFACE FROM OBJECTS IN A DATABASE

(75) Inventors: Rajeshwari Zala, Sunnyvale, CA (US); Wei-Chung Leu, Pleasanton, CA (US); Julie Hsu, San Jose, CA (US); Pramod Bangalore, San Ramon, CA (US); Yu-Ten Lee, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 101 days.

(21) Appl. No.: 13/407,967

(22) Filed: Feb. 29, 2012

(65) Prior Publication Data

US 2013/0227446 A1 Aug. 29, 2013

(51) Int. Cl.
*G06F 3/048* (2013.01)
*G06F 9/44* (2006.01)

(52) U.S. Cl.
CPC ............... *G06F 8/38* (2013.01); *G06F 9/4443* (2013.01)

(58) Field of Classification Search
CPC .......... G06F 17/3089; G06F 17/30935; G06F 8/427; G06F 8/24; G06F 9/4435; G06F 8/38; G06F 9/4443; G06F 8/30

USPC .......................................................... 715/762
See application file for complete search history.

(56) References Cited

U.S. PATENT DOCUMENTS

| | | | | |
|---|---|---|---|---|
| 5,883,639 | A * | 3/1999 | Walton et al. ................. | 345/473 |
| 6,779,027 | B1 * | 8/2004 | Schunicht et al. ............ | 709/223 |
| 7,412,689 | B1 * | 8/2008 | Quinn et al. .................. | 717/107 |
| 7,620,714 | B1 * | 11/2009 | Dini et al. ..................... | 709/224 |
| 8,504,929 | B2 * | 8/2013 | Sullivan et al. ............... | 715/760 |
| 2007/0130499 | A1 * | 6/2007 | Kim .......................... | 715/500.1 |
| 2008/0184139 | A1 * | 7/2008 | Stewart et al. ................ | 715/762 |
| 2011/0131398 | A1 * | 6/2011 | Chaturvedi et al. .............. | 713/1 |
| 2012/0324421 | A1 * | 12/2012 | Boeckenhauer et al. ..... | 717/108 |

* cited by examiner

*Primary Examiner* — Jennifer To
*Assistant Examiner* — Terri Filosi
(74) *Attorney, Agent, or Firm* — Sheridan Ross P.C.

(57) ABSTRACT

A database is parsed to identify objects that represent graphical objects. A data model file is created from the objects that are identified as graphical objects. Source code is generated from the data model file and is then executed and displayed to a user. Alternatively, the source code can be loaded as a web page. The source code is executed to generate a graphical user interface. For example, the source code can be executed by being displayed in a display or in a web browser.

20 Claims, 6 Drawing Sheets

USING SOURCE CODE GENERATED FROM A DATA MODEL FILE TO GENERATE A GRAPHICAL USER INTERFACE FROM OBJECTS IN A DATABASE

TECHNICAL FIELD

The system and method relates to graphical user interface systems and in particular to generating source code for a graphical user interface from a database.

BACKGROUND

When user interfaces are created for different systems/devices, many times a separate Graphical User Interface (GUI) is developed for each system/device. Creating a separate GUI for each system/device can lead to inefficient use of resources because many of the same services are provided with little reuse of source code. Even when source code is reused, sometimes the modifications take an extensive amount of time.

Moreover, this also leads to inconsistency in the look-and-feel of the GUIs of the different systems/devices. If different developers are creating different GUIs, the likelihood that differences in the look-and-feel of the different GUIs may lead users to take longer to use each of the different GUIs. What is needed is a way to efficiently create code for graphical user interfaces while still maintaining consistency between the GUIs.

SUMMARY

The system and method are directed to solving these and other problems and disadvantages of the prior art. A database is parsed to identify objects that represent graphical objects. A data model file is created from the objects that are identified as graphical objects. Source code is generated from the data model file and is then executed and displayed to a user. Alternatively, the source code can be loaded as a web page. The source code is executed to generate a graphical user interface. For example, the source code can be executed by being displayed in a display or in a web browser.

Graphical objects can be different types, such as text objects, buttons, radio buttons, checkboxes, windows, scroll bars, icons, pictures, SNMP integers, and SNMP octet strings. In other embodiments, the objects that represent graphical objects can also have one or more attributes. Examples of attributes can include if the object is read only, read/write, a size of the object, and a length of the object. The database can be a Simple Network Management Protocol (SNMP) Management Information Base (MIB), an xml file, a text file, an object oriented database, and a relational database.

In one embodiment, the database is a SNMP MIB. A command is received to over-write one or more of the objects in the SNMP MIB that represent graphical objects. The one or more objects that represent graphical objects are over-written. The data model file is re-created from the over-written database. The source code is re-generated from the data model file.

BRIEF DESCRIPTION OF THE DRAWINGS

In order to describe the manner in which other advantages and features of the disclosure can be obtained, a more particular description of the principles and the best mode briefly described below will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

In the appended Figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The following description and associated Figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
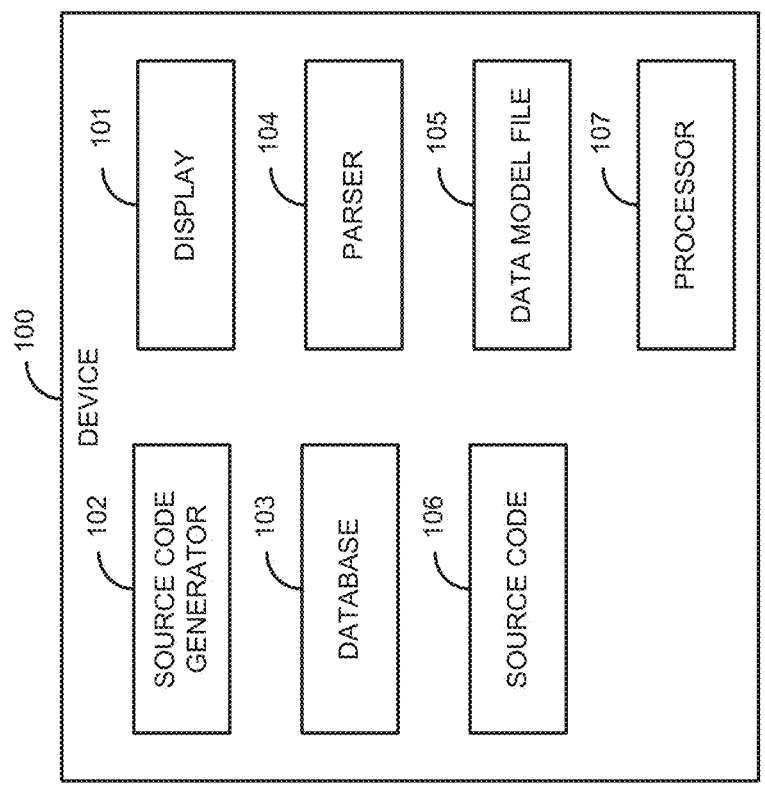
FIG. 1 is a block diagram of a first illustrative device for generating source code from a database.

FIG. 1 is a block diagram of a first illustrative device 100 for generating source code 106 from database 103. Device 100 comprises display 101, source code generator 102, database 103, parser 104, data model file 105, source code 106, and processor 107. Device 100 can be any device, such as a Personal Computer (PC), a server, a web server, a router, a printer, switch, a phone, a cellular phone, and the like. Display 101 can be any type of display, such as a Liquid Crystal Display (LCD), a plasma display, a touch screen, a cathode ray tube, a monitor, a television, and the like. Source code generator 102 can be any hardware/software that can generate source code 106, such as a compiler, an interpreter, and the like. Source code generator 102 is shown as part of device 100. However, source code generator 102 could be separate from device 100. For example, source code generator 102 could be a separate tool that generates source code 106 for embedding into device 100.

Database 103 can be any type of a database, such as a relational database, a Simple Network Management Protocol Management Information Base (SNMP MIB), an objected oriented database, a directory service, a file system, a file, an Extended Markup Language (XML) file, a text file, and the like. Parser 104 can be any hardware/software that can parse database 103. Parser 104 is shown as part of device 100. However, parser 104 can be separate from device 100. For example, parser 104 could be a separate tool.

Data model file 105 can be any file, memory, disk, and the like that can store information about graphical objects. Source code 106 can be any type of source code such as shell script, JavaScript, Java, C, C++, C##, Hyper Text Markup Language (HTML), and the like. Source code 106 can run as an application, as a web page, and the like. Source code 106 can be a mixture of different programming languages. For example, source code 106 can be a combination of HTML and JavaScript code that runs on a web page.

Processor 107 can be any type of processing element. For example, processor 107 can be a microprocessor, a Digital Signal Processor (DSP), a micro controller, a multi-core processor, and the like. Processor 107 can also include an operating system (not shown), such as Linux® or Windows®.

Parser 104 parses database 103 to identify object(s) in database 103 that represent graphical object(s). A graphical object can be any object that can be represented in a Graphical User Interface (GUI). For example, a graphical object can be a text object, a button, a radio button, a checkbox, a window, a scroll bar, an icon, a picture, a SNMP integer, a SNMP octet string, and the like. The graphical objects can be represented in various ways, such as by being textually represented, as binary objects, as numeric values, and the like. Database 103 can contain other information that does not represent graphical objects.

Parser 104 creates data model file 105 from the identified objects in database 103 that represent graphical objects. Data model file 105 is an intermediary file that is used by source code generator 102. Data model file 105 may contain data objects for each of the objects that represent graphical objects in database 103. Data model file 105 may be text, binary based, and/or the like.

Source code generator 102 generates source code 106 from data model file 105. Generated source code 106 can be any type of source code, such as shell script, JavaScript, Java, C, C++, C##, Hyper Text Markup Language (HTML), and the like. Source code generator 102 gets the data objects (that represent graphical objects) from data model file 105 and generates source code 106 that represents the data objects.

Processor 107 executes source code 106 to generate a Graphical User Interface (GUI). The GUI is displayed in display 101. A user of device 100 then can use display 101 to interact with device 100.

Figure 2:
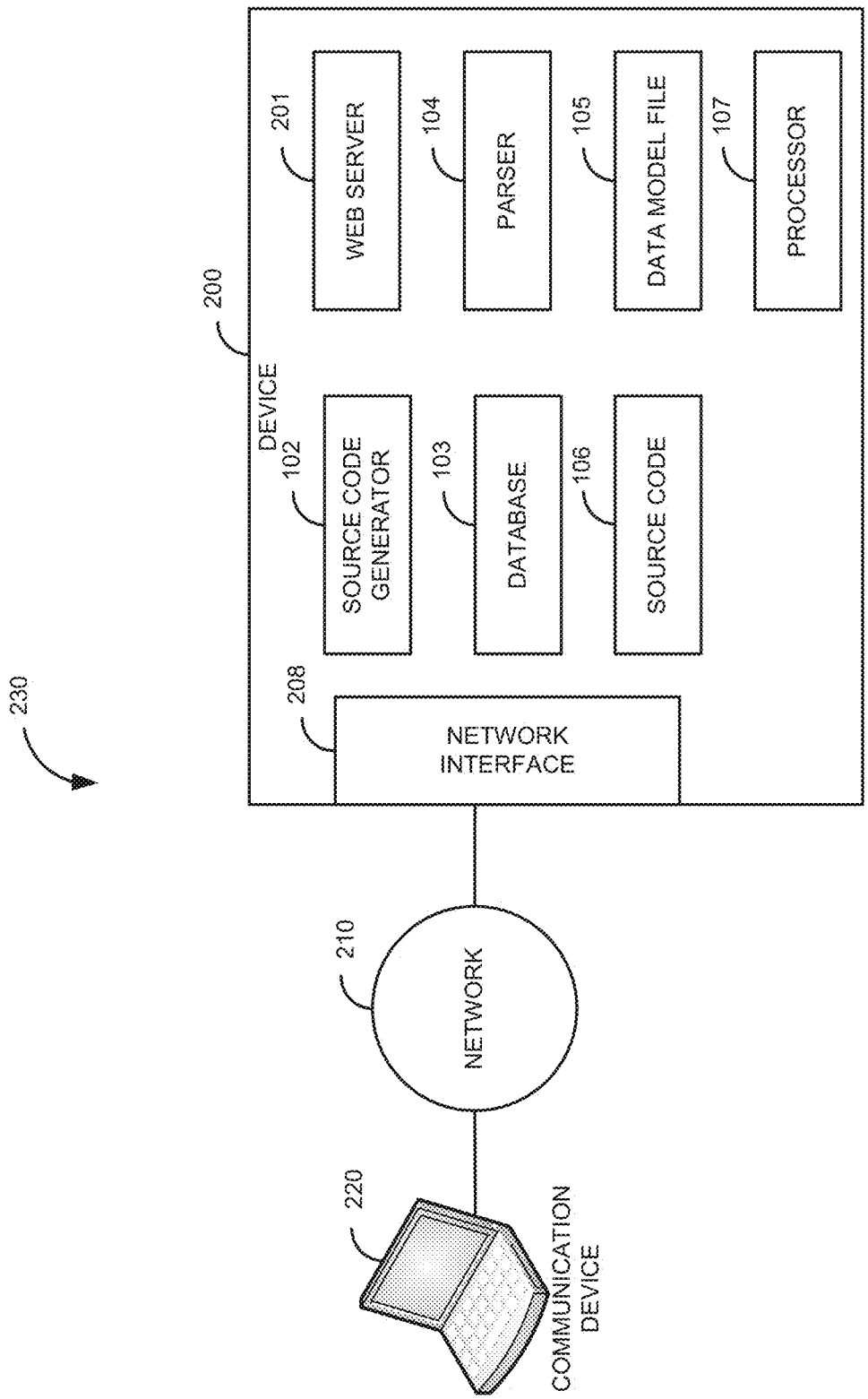
FIG. 2 is a block diagram of a first illustrative system for generating source code from a database.

FIG. 2 is a block diagram of a first illustrative system 230 for generating source code 106 from a database 103. First illustrative system 230 comprises device 200, network 210, and communication device 220. Device 200 can be any device that can connect to network 210, such as a Personal Computer (PC), a server, a web server, a router, a printer, a switch, a phone, a cellular phone, a tablet device, a Private Branch Exchange (PBX), and the like. In this illustrative example, device 200 further comprises web server 201, source code generator 102, database 103, parser 104, data model file 105, source code 106, processor 107, and network interface 208.

Network interface 208 can be any hardware/software that can communicate with network 210. For example, network interface 208 can be an Ethernet card, an 802.11 interface, a cellular interface, a wireless interface, an optical interface, a modem, an Integrated Digital Services Network (ISDN) interface, a Digital Subscriber Link (DSL) interface, and the like. Web server 201 can be any type of web server.

Network 210 can be any network that can send and receive data, such as the Internet, a Wide Area Network (WAN), a Local Area Network (LAN), the Public Switched Telephone Network (PSTN), a packet switched network, a circuit switched network, a cellular network, a combination of these, and the like. Network 210 can use a variety of protocols, such as Ethernet, Internet Protocol (IP), Session Initiation Protocol (SIP), Integrated Services Digital Network (ISDN), and the like.

Communication device 220 can be any device that can communicate with network 210. Communication device 220 can be a Personal Computer (PC), a server, a router, a printer, a switch, a Private Branch Exchange (PBX), a cellular device, a phone, a tablet device, and the like.

Parser 104 parses database 103 to identify objects in database 103 that represent graphical objects. Parser 104 creates data model file 105 from the identified objects in database 103 that represent graphical objects. Source code generator 102 generates source code 106 from data model file 105. Processor 107 executes source code 106 to generate web pages. The generated web pages are loaded into web server 201. The web pages are then presented to a user of communication device 220 via a browser (not shown) in communication device 220.

Figure 3:
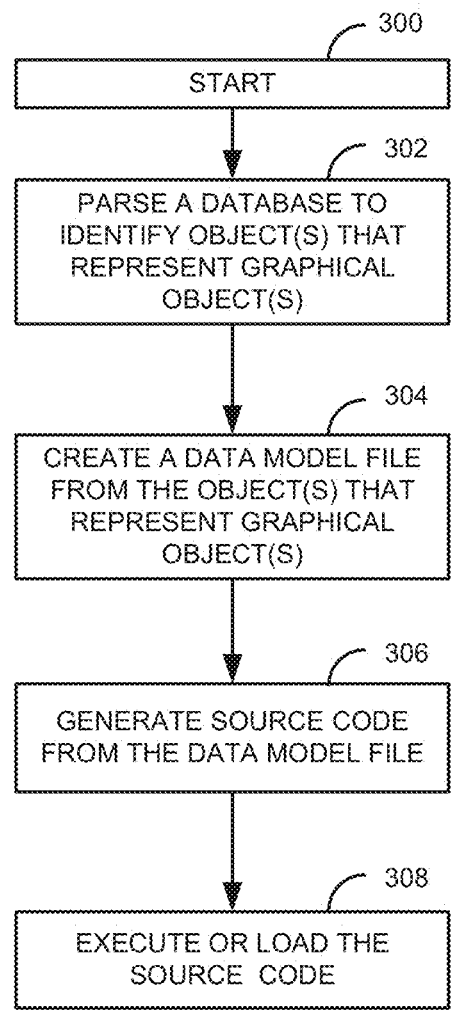
FIG. 3 is a flow diagram of a method for generating source code from a database.

FIG. 3 is a flow diagram of a method for generating source code 106 from a database 103. Illustratively, device 100/200, display 101, source code generator 102, parser 104, web server 201, network interface 208, and communication device 220 are stored-program-controlled entities, such as a computer or processor 107, which perform the method of FIGS. 3-6 and the processes described herein by executing program instructions stored in a tangible computer readable storage medium, such as a memory or disk.

The process starts in step 300. Parser 104 parses 302 database 103 to identify object(s) in database 103 that represent graphical object(s). Parser 104 creates 304 data model file 105 from the identified object(s) in database 103 that represent graphical object(s). Creating data model file 105 also comprises adding to an existing file. Source code generator 102 generates from data model file 105 source code 106. Processor 107 executes or loads source code 106 to generate web pages or to display in display 101.

Figure 4:
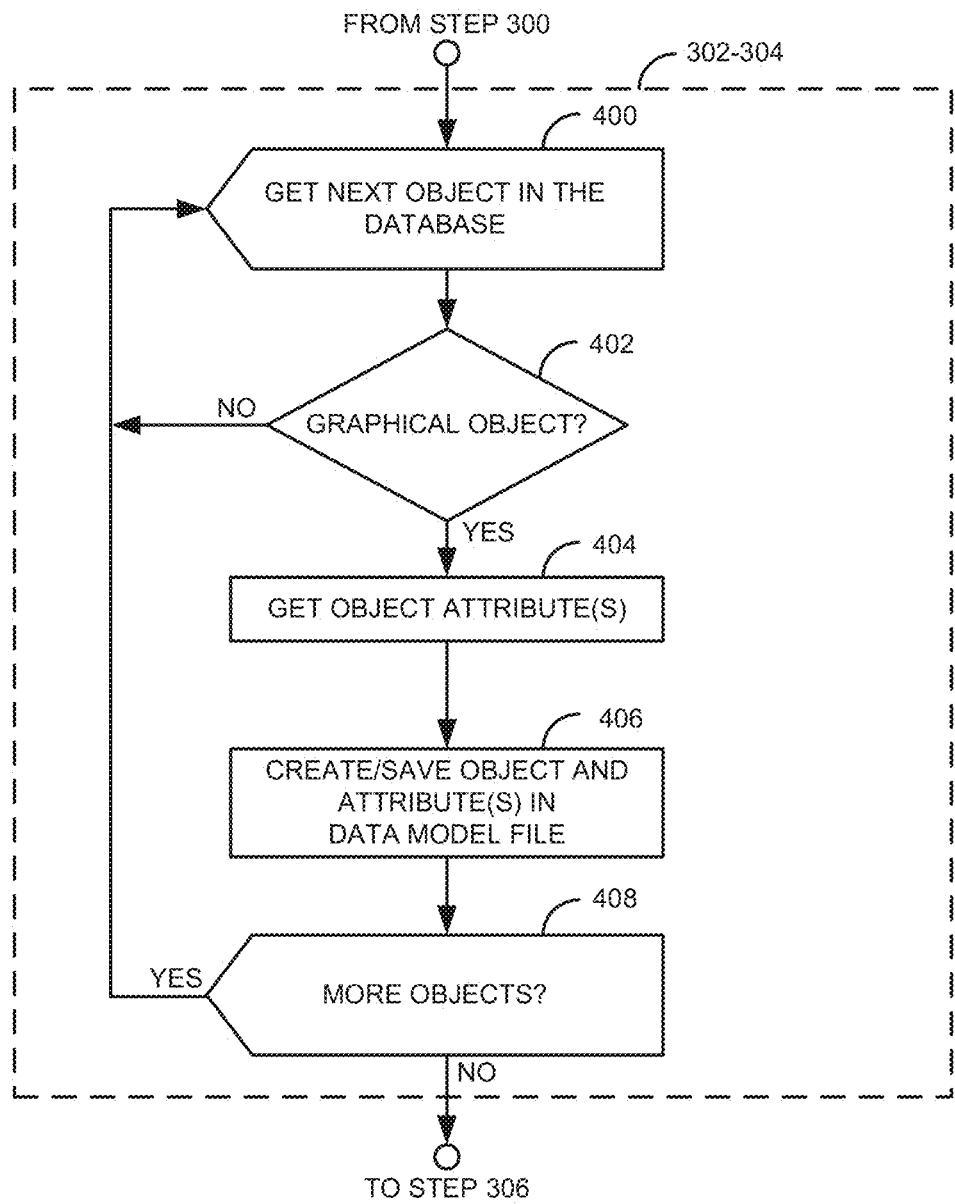
FIG. 4 is a flow diagram of a method for creating a data model file from a database.

FIG. 4 is a flow diagram of a method for creating a data model file 105 from a database 103. FIG. 4 is an expanded view of steps 302 and 304 in FIG. 3. After starting in step 300, parser 104 gets 400 the next object in database 103. In step 402, parser 104 determines if the object is a graphical object. If the object is not a graphical object, the process goes to step 400.

Otherwise, if the object is a graphical object in step 402, parser 104 gets any 404 attribute(s) for the graphical object. An attribute of a graphical object can be any attribute that defines the graphical object. For example, an attribute can be if the object is read only, if the object is read/write, a size of the object, a length of the object, and the like. The graphical object and attribute(s) are then saved 406 to data model file 105. If data model file 105 does not exist in step 406, parser 104 creates data model file 105 and saves the object and any attributes. Parser 104 checks in step 408 if there are more objects in database 103. If there are more objects in database 103, the process goes to step 400. Otherwise, the process goes to step 306.

To further illustrate this process, consider the following example. Assume that database 103 is a SNMP MIB that contains a SNMP integer, and a SNMP octet string. The SNMP integer is read only and has a name of "Counter." The SNMP octet string is read/write, has a name of "Device Name," and has a length of 128. Parser 104 gets the SNMP integer in step 400. In step 402, parser 104 determines that the SNMP integer is a graphical object. Parser 104 can determine if an object is a graphical object based on various criteria. For example, graphical objects can be predefined or user definable. Parser 104 gets 404 the two attributes (Counter and read/write) associated with the SNMP integer. The graphical object "Counter" is saved in a format that represents an integer along with the attributes of read/write in step 406.

Parser 104 determines in step 408 that there are more objects in the SNMP MIB (103). Parser 104 gets 400 the next object (the SNMP octet string) in the SNMP MIB (103). Parser 104 determines 402 that the SNMP octet string is also a graphical object. Parser 104 gets 404 the attributes (read/write and length) for the octet string "Device Name." The octet string, "Device Name," and length (128) are saved 406 in data model file 105. Parser 104 determines in step 408 that there are no more objects in database 103 and the process goes to step 306. The attribute(s) can represent other attributes of the graphical object, such as a size of the object or a position of the object. Moreover, a graphical object could be a table that contains multiple graphical objects. For example, a table that contains multiple octet strings.

Figure 5:
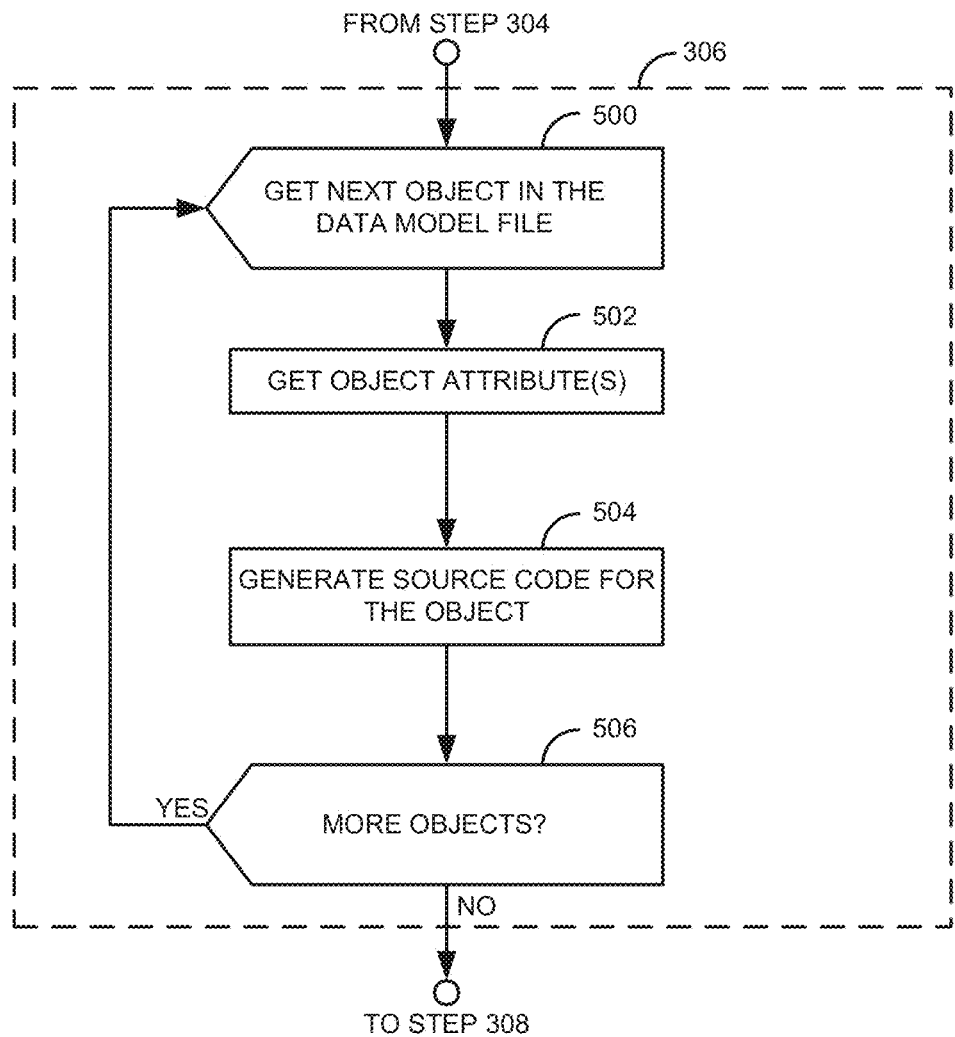
FIG. 5 is a flow diagram of a method for creating source code from a data model file.

FIG. 5 is a flow diagram of a method for creating source code 106 from data model file 105. FIG. 5 is an expanded view of step 306 in FIG. 3. After step 304, source code generator 102 gets 500 the next object in data model file 105. Source code generator 102 gets 502 any attribute(s) associated with the object. Source code generator 102 generates 504 source code 106 for the object. Source code generator 102 determines in step 506 if there are any more objects in the data model file 105. If there are more objects in the data model file 105, the process goes to step 500. Otherwise, if there are not any more objects in the data model file 105, the process goes to step 308.

To further illustrate how the process of FIG. 5 works, assume that data model file 105 contains the SNMP integer and a SNMP octet string described previously. In step 500, source code generator 102 gets 500 the next object (the SNMP Integer object) in data model file 105. Source code generator 102 gets the attributes read only and the name "Counter" for the SNMP integer object.

Source code generator 102 generates source code 106 for the SNMP Integer. For example, depending on the programming language (e.g., JavaScript), source code generator 102 creates code that displays a read only text object with the text string "Counter" and a read only text object that converts the value of the counter object in the SNMP MIB to be displayed as part of a web page. If the location of an object is not defined, source code generator can generate source code 106 that creates a pre-defined location based on the object types, screen size, other objects in the web page, and/or other information.

Source code generator 102 checks data model file 105 in step 506 to determine if there are more objects in data model file 105. Source code generator 102 determines in step 506 that there is another object in data model file 105. Source code generator 102 gets 500 the SNMP octet string. Source code generator 102 gets 502 attributes of the octet string (read/write, the string "Device Name", and the length of 128). Source code generator 102 generates 504 source code 106 for the SNMP octet string. Source code generator 102 creates a text object with the text "Device Name" and a text box that has a length of 128 characters. The text box is also writable. Source code generator 102 determines in step 506 that there are no more objects in data model file 105 and the process goes to step 308. In step 308, the SNMP integer is displayed to a user by reading the counter value from the SNMP MIB. The SNMP octet string "Device Name" is also displayed to the user along with the text box with a length of 128 characters. The value of the "Device Name" SNMP object from the SNMP MIB is displayed in the text box. The user then can edit the "Device Name" SNMP octet string and save the string into the SNMP MIB. This can be done where source code generator 102 also creates a save button that allows the user to save objects that are writable into the SNMP MIB.

Figure 6:
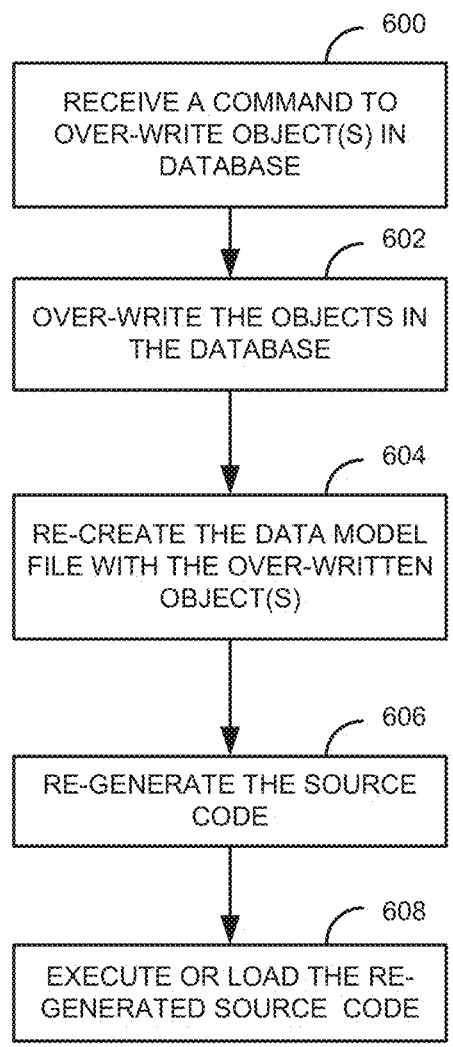
FIG. 6 is a flow diagram of a method for overwriting graphical objects in a database and re-generating the source code based on the changes.

FIG. 6 is a flow diagram of a method for overwriting graphical objects in a database 103 and re-generating the source code 106 based on the changes. The process begins in step 600 when a command is received to overwrite one or more objects in database 103. The command can come from different sources. For example, a user at display 101 could indicate through a Graphical User Interface (GUI) that he/she wants to change an object in database 103. Similarly, network interface 208 could receive the command from communication device 220. The objects in database 103 are overwritten in step 602. Parser 104 re-creates 604 data model file 105 from database 103 (that contains the over-written object(s)). Source code generator 102 re-generates 606 source code 106. Processor 107 executes or loads 608 the re-generated source code 106.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:
1. A method comprising:
parsing with a parser, a database to identify one or more objects in the database that represent a graphical object;
creating with the parser, a data model file from the identified one or more objects in the database that represent the graphical object, wherein the data model file only comprises graphical objects, wherein creating the data model file comprises getting each object in the database that represents the graphical object and wherein one or more attributes associated with each object in the database that represents the graphical object comprises at least one of the following: if the object is read only, if the object is read or write, a size of the object, or a length of the object;
getting the one or more attributes associated with each object in the database that represents the graphical object generating from the data model file, with a source code generator, source code, wherein the source code is used to generate a graphical user interface and wherein the database does not contain the source code;

executing the source code to generate the graphical user interface;

generating, in the graphical user interface and based on the source code, a representation of the identified one or more objects in the database;

receiving, via the generated representation of the identified one or more objects in the database, a command to overwrite the representation of the identified one or more objects in the database;

overwriting the identified one or more objects in the database; and in response to overwriting the identified one or more objects in the database, re-creating, with the parser, the data model file from the over-written database and re-generating the source code from the re-created data model file.

2. The method of claim 1, wherein the one or more objects in the database that represent graphical objects comprises at least one of the following: a text object, a button, a radio button, a checkbox, a window, a scroll bar, an icon, a picture, a SNMP integer, and a SNMP octet string.

3. The method of claim 1, wherein the database is at least one of the following: a Simple Network Management Protocol (SNMP) Management Information Base (MIB), an xml file, a text file, an object oriented database, and a relational database.

4. The method of claim 1, wherein the database is a Simple Network Management Protocol (SNMP) Management Information Base (MIB).

5. The method of claim 1, further comprising the step of loading the source code into a web server.

6. The method of claim 1, wherein the source code is at least one of the following: shell script, JavaScript, Java, C, C++, C##, and Hyper Text Markup Language (HTML).

7. The method of claim 1, further comprising:

determining that the identified one or more objects in the database comprises an object that is writable; and in response to determining that one or more objects in the database comprise the object is writeable, automatically creating a save button in the graphical user interface to allow a user to save the writable object into the database.

8. The method of claim 1, wherein a user defines if an object in the database is a graphical object.

9. A system having a processor comprising:

a parser that parses a database to identify one or more objects in the database that represent a graphical object, creates a data model file from the identified one or more objects in the database that represent the graphical object by getting each object in the database that represents the graphical object, gets one or more attributes associated with each object in the database that represents the graphical object, wherein the one or more attributes associated with each object in the database that represents the graphical object comprises at least one of the following: if the object is read only, if the object is read or write, a size of the object, or a length of the object, and re-creates the data model file from an over-written database in response to overwriting the identified one or more objects in the database;

a source code generator that generates source code from the data model file, wherein the source code is used to generate a graphical user interface and wherein the database does not contain the source code, and re-generates the source code from the re-created data model file in response to overwriting the identified one or more objects in the database; and the graphical user interface that generates, based on the source code, a representation of the identified one or more objects in the database, receives a command, via the generated representation of the identified one or more objects in the database, to overwrite the representation of the identified one or more objects in the database, and overwrites the identified one or more objects in the database.

10. The system of claim 9, wherein the one or more objects in the database that represent graphical objects comprises at least one of the following: a text object, a button, a radio button, a checkbox, a window, a scroll bar, an icon, and a picture.

11. The system of claim 9, wherein the database is at least one of the following: a Simple Network Management Protocol (SNMP) Management Information Base (MIB), an xml file, a text file, an object oriented database, and a relational database.

12. The system of claim 9, wherein the database is a Simple Network Management Protocol (SNMP) Management Information Base (MIB).

13. The system of claim 9, further comprising the steps of executing the source code to generate the graphical user interface.

14. The system of claim 9, further comprising the step of loading the source code into a web server.

15. The system of claim 9, wherein the source code is at least one of the following: shell script, JavaScript, Java, C, C++, C##, and Hyper Text Markup Language (HTML).

16. A non-transitory computer readable medium having stored thereon instructions that cause a processor to execute a method, the method comprising:

instructions to parse a database to identify one or more objects in the database that represent a graphical object;

instructions to create a data model file from the identified one or more objects in the database that represent the graphical object, wherein the data model file only comprises graphical objects, wherein creating the data model file comprises getting each object in the database that represents the graphical object and wherein one or more attributes associated with each object in the database that represents the graphical object comprises at least one of the following: if the object is read only, if the object is read or write, a size of the object, or a length of the object; and instructions to get the one or more attributes associated with each object in the database that represents the graphical object;

instructions to generate source code from the data model file, wherein the source code is used to generate a graphical user interface and wherein the database does not contain the generated source code;

instructions to generate, in the graphical user interface and based on the source code, a representation of the identified one or more objects in the database;

instructions to receive, via the generated representation of the identified one or more objects in the database, a command to overwrite the representation of the identified one or more objects in the database;

instructions to overwrite the identified one or more objects in the database; and in response to overwriting the identified one or more objects in the database, instructions to re-create, with the parser, the data model file from the over-written database and instructions to re-generate the source code from the re-created data model file.

17. The non-transitory computer readable medium of claim 16, wherein the one or more objects in the database that represent graphical objects comprises at least one of the following: a text object, a button, a radio button, a checkbox, a window, a scroll bar, an icon, a picture, a SNMP integer, or a SNMP octet string.

18. The non-transitory computer readable medium of claim 16, wherein the database is at least one of the following: a Simple Network Management Protocol (SNMP) Management Information Base (MIB), an xml file, a text file, an object oriented database, or a relational database.

19. The non-transitory computer readable medium of claim 16, wherein the database is a Simple Network Management Protocol (SNMP) Management Information Base (MIB).

20. The non-transitory computer readable medium of claim 16, further comprising instructions to load the source code into a web server.

\* \* \* \* \*

UNITED STATES PATENT AND TRADEMARK OFFICE
CERTIFICATE OF CORRECTION

PATENT NO. : 9,189,210 B2
APPLICATION NO. : 13/407967
DATED : November 17, 2015
INVENTOR(S) : Rajeshwari Zala et al.

Page 1 of 1

It is certified that error appears in the above-identified patent and that said Letters Patent is hereby corrected as shown below:

In The Specification

At Column 6, line 67, after "object" insert --;-- therein.

At Column 8, line 48, after "object;" delete "and" therein.

Signed and Sealed this
Twenty-second Day of March, 2016

Michelle K. Lee
*Director of the United States Patent and Trademark Office*